United States Patent [19]

Kritz

[11] Patent Number: 4,551,826

[45] Date of Patent: Nov. 5, 1985

[54] MULTIPLE BEAM LENS TRANSDUCER WITH COLLIMATOR FOR SONAR SYSTEMS

[75] Inventor: Jacob A. Kritz, Westbury, N.Y.

[73] Assignee: Sperry Corporation, New York, N.Y.

[21] Appl. No.: 708,388

[22] Filed: Mar. 8, 1985

Related U.S. Application Data

[63] Continuation of Ser. No. 453,303, Dec. 27, 1982, abandoned.

[51] Int. Cl.$^{4}$ .......... H04B 13/00

[52] U.S. Cl. .......... 367/150; 310/335; 367/153

[58] Field of Search .......... 367/140, 141, 150, 152, 367/153, 155, 157; 310/335; 73/642

[56] References Cited

U.S. PATENT DOCUMENTS

| | | | |
|---|---|---|---|
| 2,906,993 | 7/1959 | Steinberger | 367/152 |
| 3,979,565 | 9/1976 | McShane | 367/157 |
| 4,001,766 | 1/1977 | Hurwitz | 367/150 |
| 4,296,482 | 10/1981 | Kritz | 367/150 |
| 4,385,255 | 5/1983 | Yamaguchi et al. | 360/335 |
| 4,440,025 | 4/1984 | Hayakawa et al. | 367/150 |

OTHER PUBLICATIONS

The Effects of Backing and Matching on the Performance of Piezoelectric Ceramic Transducers, by George Kossoff, IEEE on Sonic and Ultrasonic vol. Su-13, No. 1, 3/66, pp. 20-31.

"Doppler Sonar Velocity Log for Attack Submarines", by Wapner et al., IEEE, Position, Location and Navigation Symposium, Atlantic City, N.J., Dec. 8-11, 1980.

*Primary Examiner*—Harold J. Tudor
*Attorney, Agent, or Firm*—Howard P. Terry

[57] ABSTRACT

A compact apparatus for transmitting and receiving multiple sonar beams utilizes an acoustic lens to direct plane waves incident in desired directions to collimating lenses for presentation in phase to electroacoustic transducers having planar surfaces. The electroacoustic transducers emit sound waves which are transformed by the lenses into plane waves emergent in the desired directions.

19 Claims, 4 Drawing Figures

MULTIPLE BEAM LENS TRANSDUCER WITH COLLIMATOR FOR SONAR SYSTEMS

This is a continuation of co-pending application Ser. No. 453,303 filed on Dec. 27, 1982, now abandoned.

BACKGROUND OF THE INVENTION

1. Field of the Invention

The present invention relates generally to electroacoustic transducers employed in sonar systems, and more particularly to an electroacoustic transducer capable of accommodating multiple sonar beams which utilizes collimating acoustic lenses.

2. Description of the Prior Art

Sonar systems utilize narrow beams of sound energy projected in certain desired directions from a marine vehicle, and receive reflected energy from these directions, as described, for example, in U.S. Pat. No. 3,257,638, Doppler Navigation System, issued to Jack Kritz and Seymour D. Lerner in 1966. Conventionally, these beams are produced by vibrating piezoelectric discs with diameters that are large compared to the wavelength of the soundwave propagated or to be received. When multiple beams are utilized, the transducer assembly must be enlarged to accommodate the multiplicity of necessary elements. Multiple beam transducers of the prior art create installation difficulties, particularly on small ships, and provoke increased installation costs due to larger gate valves and stronger required structural supports. Thus, there is a need for relatively compact multiple beam transducers that will facilitate installation and mitigate attendant costs.

The Inventor's prior application, Ser. No. 354,973, filed Mar. 5, 1982, entitled Multiple Beam Lens Transducer For Sonar Systems describes a compact apparatus for transmitting and receiving multiple sonar beams. An acoustic lens directs plane waves incident in desired directions to electroacoustic transducers disposed in spherical shell segments centered in the focal regions of the lens associated with the incident beams. The electroacoustic transducers transmit spherical waves that are transformed by the acoustic lens to plane waves emergent in the desired directions.

The manufacture of this transducer entails some difficulty and expense resulting from the need to fabricate piezoceramic crystal elements in the form of spherical shell segments.

SUMMARY OF THE INVENTION

An object of the invention is to maintain the compact configuration of the Multiple Beam Lens Transducer For Sonar Systems, supra, while eliminating the need for electroacoustic transducers in the shape of spherical shell segments.

A sonar transducer embodying the principles of the present invention includes means for converting incident plane sound waves to sound waves that converge at a focal surface thereof. Plane waves incident in different predetermined directions are converged to different focal regions. Sound waves emitted from the focal regions are converted to plane sound waves which are radiated in these predetermined directions. Electroacoustic transducers having planar surfaces are employed for receiving and transmitting sound waves. Means for presenting the focussed sound waves in phase at the planar surfaces of the transducers are provided. Sound waves emitted by the planar surfaces of the transducers are converted to diverging beams which are radiated from the invention as plane waves in the predetermined directions.

A preferred embodiment of the invention comprises a doubly concave acoustic lens which focuses plane waves incident from a plurality of predetermined directions to a plurality of focal regions in corresponding relationship with the incident directions. A medium of silicone rubber is bonded to the inner surface of the lens. The low speed of sound in rubber produces a short focal length, thus diminishing assembly depth. Acoustic lenses having spherical surfaces are positioned to collimate the focussed sound waves to provide plane waves at the planar surface of three piezoelectric ceramic crystal transducers. Positioned between the collimating lenses and the planar surfaces of the transducers are epoxy matching sections. A matching section provides favorable electrical characteristics when measured at the electrical terminal of a crystal by transforming the low acoustic impedance of a collimating lens to a higher value for presentation to the crystal. Aluminum backing plates ae positioned behind the transducers. The backing plates provide both structural strength and heat transport for the crystals. The planar surfaces of the transducers are positioned to receive and transmit beams which are each inclined 15 degrees from the central axis of the doubly concave lens.

Figure 3:
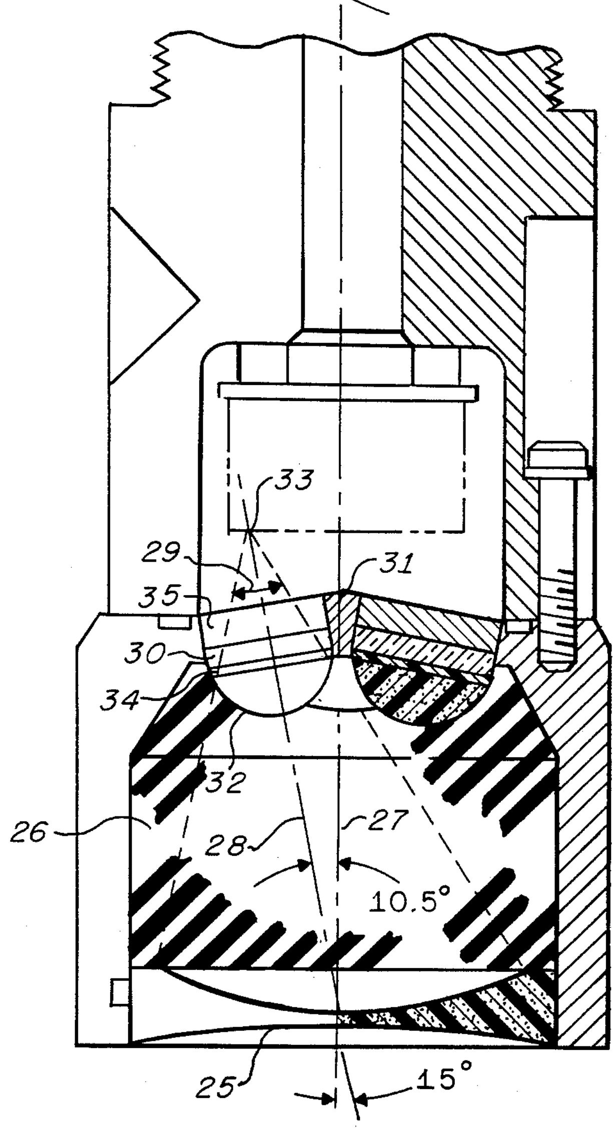
FIG. 3 is a cross-sectional view of a preferred embodiment of the invention.

FIG. *3a* is a cross-sectional view of a lens assembly useful in the preferred embodiment of FIG. 3.

Identical numerals in different figures correspond to identical elements.

DESCRIPTION OF THE PREFERRED EMBODIMENTS

Figure 1:
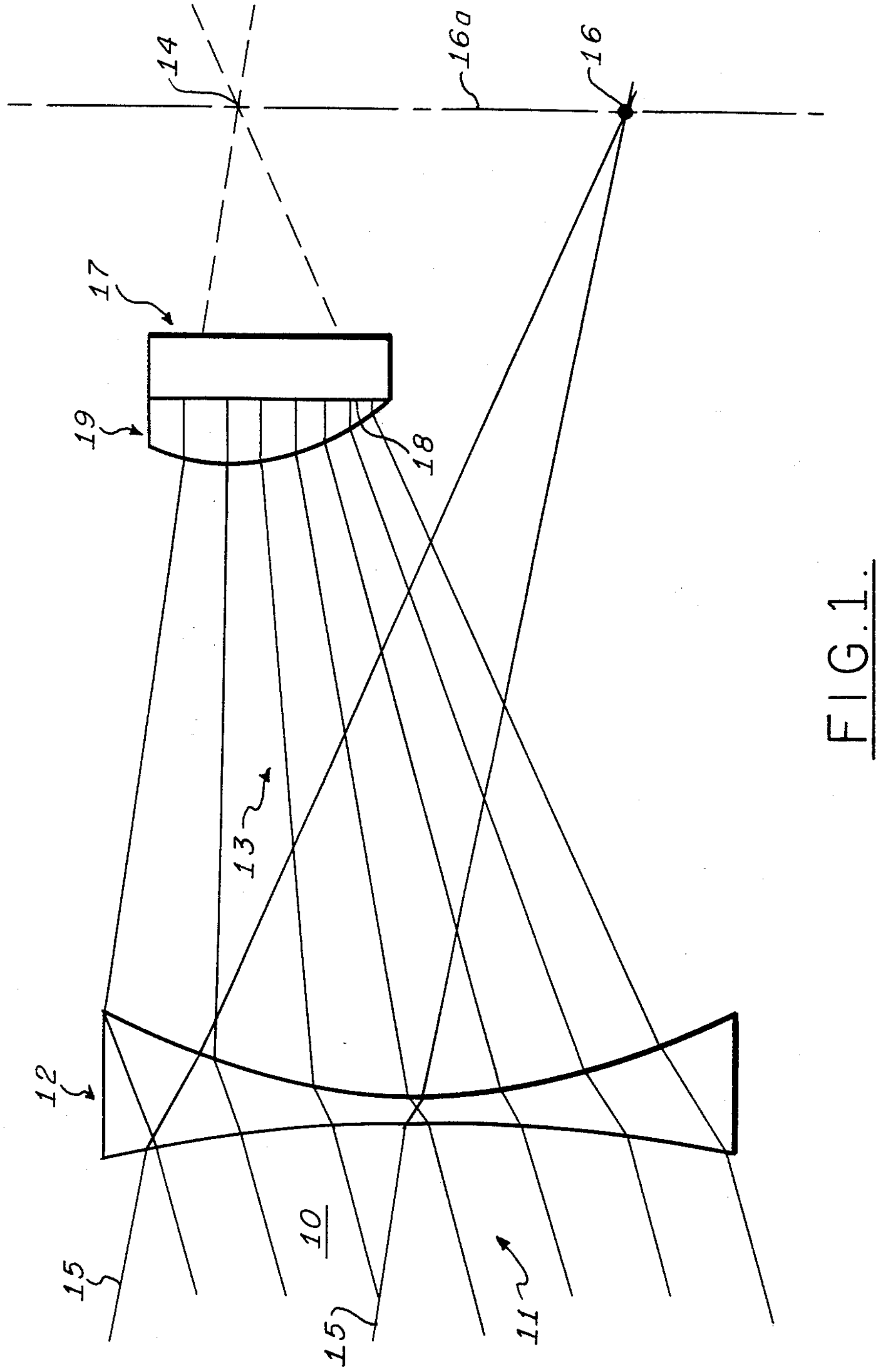
FIG. 1 is a schematic diagram of a doubly concave acoustic lens, an electroacoustic transducer having a planar surface, and a collimating acoustic lens disposed therebetween, with a superposed ray diagram illustrating the action of the lenses.

The invention relates to a method of constructing a multiple beam transducer with a single aperture in the form of an acoustic lens which provides the required aperture to wavelength ratio. A ray diagram depicting the focusing action of the acoustic lens is shown in FIG. 1. Parallel rays of incident plane wave 10, propagating in water medium 11, impinge on acoustic lens 12. To focus an incident plane wave, acoustic lens 12 is chosen doubly concave and constructed of a medium in which the sound velocity is greater than that in water 11 and adjacent medium 13. The focusing action results from the beam's being first bent away from the normal to the surface of the lower refractive index as it enters the lens, and then upon emergence from the lens, being bent towards the normal. Accordingly, incident plane sound wave 10 is focused to focal point 4 by the lens thus constructed. Conversely, a point source at 14 radiating lens 12 with a sound wave will cause the projection of plane wave depicted by the parallel rays 10. Characteristic of a lens constructed in this fashion is a unique correspondence between the direction of incidence of incidence of a plane wave, and the associated focal point in the focal plane of the lens. Simply, collimated beams incident from different directions have different focal points. For example, the plane wave represented by parallel rays 15 will be focused at second focal point 16. Thus, a multiplicity of such focal points lies in focal plane 16a of lens 12, each focal point defining a different beam direction for reception or projection of sound waves. A multiplicity of small electroacoustic transducers placed at different focal points can then be used to transmit and receive sound beams such that the beam width is characterized by the lens diameter.

A major deterrent to the implementation of such an arrangement is the inability of the small transducers to operate at significant power levels. The sound intensity (watts per unit area) in medium 13 in the vicinity of a transducer is intense because of the small transducer surface area, causing cavitation and disruption of the medium. In addition, heat dissipation produced by transducer losses is confined to the small transducer surface, causing high temperatures to be generated if significant electrical power is supplied. The present invention utilizes larger transducers having significantly more surface area, which are placed forward of the focal points. Electrocoustic transducer 17, having a planar surface 18 for receiving and transmitting waves, is disposed between focal point 14 and lens 12. Lens 19, disposed between electroacoustic transducer 17 and lens 12 presents rays in phase to surface 18 of electroacoustic transducer 17. Lens 19 achieves this by refracting the converging rays and directing them perpendicular to planar surface 18 of electroacoustic transducer 17. The material comprising lens 19 possesses a sound velocity greater than that of medium 13, and a specific acoustic impedance preferably near that of medium 13 in order to minimize unwanted reflections. With the above, substantially all the acoustic energy received by lens 12 is thus available for conversion to electrical energy by electroacoustic tranducer 17. Conversely, when transmitting, transducer 17 in conjunction with lens 19 projects rays as though focal point 14 were the source. An advantage obtained by this arrangement is that small changes in the position of the focal point do not cause drastic changes in performance, since all rays are still intercepted by transducer 17 with only slight out of phase interference. With small transducer elements directly at the focal points, small changes in focal point location can precipitate large changes in the captured energy. As a further advantage, the depth of the entire apparatus is reduced, since the apparatus need not extend behind lens 12, in medium 13, to the focal plane.

Figure 2:
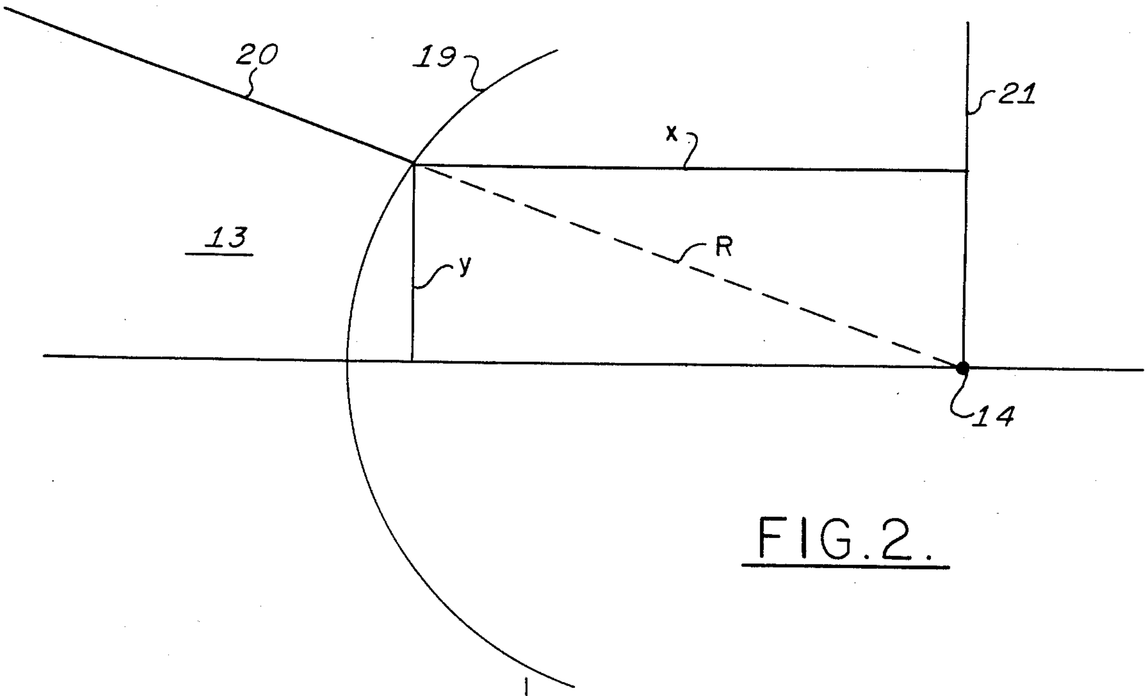
FIG. 2 is a schematic diagram of a ray impinging upon a collimating acoustic lens, utilized for calculating the curvature of the lens.

The curvature of lens 19 required to present the rays in phase to planar surface 18 of electroacoustic transducer 17 may be determined with the aid of FIG. 2. Ray 20 directed towards focal point 14 impinges on the surface of lens 19. Absent lens 19, ray 20 would travel through medium 13, whose propagation speed is $C_M$, a distance R to focal point 14. With lens 19 present, ray 20 travels through the lens medium, whose propagation speed $C_L$, a distance X to Y axis 21 drawn through focal point 14. For all the rays refracted by lens 19 to arrive at Y axis 21 in phase, the propagation time, $t_m$, that would have been experienced in medium 13 by an individual ray, if the lens were not present, must be equal to the time, $t_L$, taken by that ray to traverse the lens material plus an additive constant, k. Accordingly, $$t_m = R/c_m = t_L + k = (X/c_L) + k.$$

Thus, $$\left(\frac{R}{c_m}\right)^2 = \left(\frac{x}{c_L} + k\right)^2 = \left(\frac{1}{c_L}(x + c_L k)\right)^2$$

By the pythagorean theorem $R^2 = X^2 + Y^2$, so that $$\frac{R^2}{c_{m2}} = \frac{X^2 + Y^2}{c_{m2}} = \frac{1}{c_{L2}}(X + C_L K)^2, \text{ and}$$

$$X^2 + Y^2 = \left(\frac{c_m}{c_L}\right)^2 (X + C_L K)^2.$$

This is the well-known equation for a conic with eccentricity equal to $c_m/c_L$ and a directrix equal to $C_L K$. Since the material of lens 19 has a higher propagation velocity then medium 13, $c_m/c_L$ is less than one, and therefore, the curve is an ellipse.

The elliptical shape of lens 19 may be approximated by a sphere whose radius is selected to provide the best fit over the region of interest.

A typical design embodying the invention is shown in FIG. 3. Solid lens 25, of syntactic foam, 6.75 inches in diameter, 0.376 inches center thickness, with internal radius 7.18 inches, and external radius 23.82 inches is in contact with water on its outer surface and bonded on its inner surface to medium 26, of silicone rubber. The arrangement shown provides for three transmitting or receiving beams each oriented in the water 15 degrees off central axis 27 of lens 25. The low speed of sound in rubber produces short focal length 28 of 10.91 inches, thus diminishing the assembly depth. Subtended angle 29 is 33°.

Figure 3A:
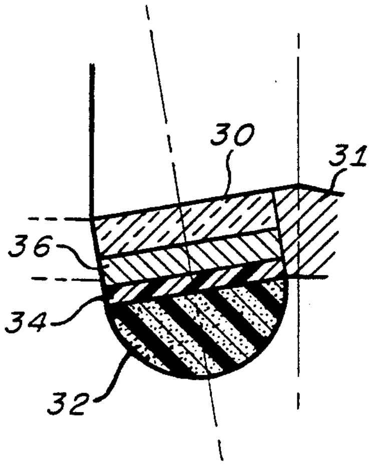

Each of three piezoelectric ceramic crystals, such as 30, has a planar surface for receiving and transmitting beams, and each crystal has a diameter of 2.5 inches. Each crystal is disposed 10.5 degrees off central axis 27 of lens 25. The crystals are each of such thickness that they resonate at 122 kHz, and are bonded to metal support 31. A collimating lens, such as 32, comprised of the same syntatic foam material as lens 25, collimates the rays of a focused beam for presentation to the planar surface of a crystal. The elliptical surface of each collimating lens is approximated by a spherical surface of radius 2.15 inches centered 1.85 inches forward of a focal point, such as 33. Interposed between each crystal and its associated collimating lens is a plastic matching section, such as 34, preferably comprised of epoxy. Each matching section has diameter 2.5 inches and has thickness equal to an odd multiple of a quarter wavelength, in this embodiment a quarter wavelength, 0.21 inches. The matching section provides favorable electrical characteristics when measured at the electrical terminals of a crystal by transforming a low acoustic impedance to a higher value for presentation to the crystal. The section creates an acoustic impedence match between a crystal and a collimating lens. Essentially two purposes are served by the matching section: it broadens bandwidth, and increased efficiency of the transducer (see, *The Effect of Backing and Matching on the Performance of Piezoelectric Ceramic Transducers*, by George Kossoff, I.E.E.E. Transactions on Sonics and Ultrasonics, Volume SU-13, No. 1, March 1966). Disposed on the surface of each crystal opposite the receiving surface is a backing plate, such as 35, comprising metal, preferably aluminium, having diameter 2.5 inches, and thickness an integral multiple of a half wavelength, in this case 1.02 inches. The backing plate provides both structural strength and heat transport for the crystals, and is essentially transparent at the operating frequency. The transparency, that is, the negligible effect upon the transmission of waves, follows from the standard sound transmission coefficient formula for waves traversing two boundaries (see, for example, *Fundamentals of Acoustics*, page 149 to 152, by Kinsler and Frey, Wiley, 1950). If only heat conduction is desired from the backing plate, it may be made thinner. A plate 36 may altenatively be positioned in contact with the receiving and transmitting surface of a crystal 30, as shown in FIG. 3*a*. The matching section 34 may then be utilized between the plate 36 and the collimating lens 32 to provide an acoustic impedance match between the plate 36 and the lens 32.

Since a collimating lens has been constructed, see FIG. 2, such that rays traversing its medium are in phase at Y axis 21, the rays are necessarily in phase in the medium at any line parallel to Y axis 21. Accordingly, rays immediately emerging from the planar surface of a lens are in phase, and remain so as they pass through mediums of uniform thickness en route to the planar surface of a crystal.

While the invention has been described in its preferred embodiments it is to be understood that the words which have been used are words of description rather than limitation that changes may be made within the purview of the appended claims without departing from the true scope and spirit of the invention in its broader aspects.

I claim:

1. A multiple beam lens transducer for sonar systems comprising:

a first acoustic lens having a focal plane, a plurality of electro-acoustic transducers, each having a planar surface positioned between said first acoustic lens and said focal plane; and a plurality of second lenses each having an outwardly curved forward surface facing said first acoustic lens and a planar surface adjacent said planar surface of a corresponding one of said plurality of electro-acoustic transducers, said second lenses constructed to collimate focussed acoustic waves incident at said curved surfaces so that in-phase collimated waves are coupled from said planar surfaces of said second lenses to said planar surfaces of said electro-acoustic transducers.

2. Apparatus as described in claim 1 wherein said first lens means comprises a doubly concave acoustic lens.

3. Apparatus as described in claim 2 further comprises matching means positioned between said electro-acoustic transducers and said second lenses for providing an acoustic impedance match between said electro-acoustic transducers and said second lens means.

4. Apparatus as described in claim 3 further comprising backing plate means positioned adjacent surfaces of said electroacoustic transducers opposite said planar surfaces for transporting heat and providing structural strength.

5. Apparatus as described in claim 2 further comprising plate means positioned between said electroacoustic transducers and said second lenses for transmitting acoustic signals, transporting heat, and providing structural strength; and matching means, positioned between said plate means and said second lenses for providing an acoustic impedance match between said plate means and said second lenses.

6. Apparatus as described in claim 2 wherein said curved surface of said second lenses are elliptical surfaces.

7. Apparatus as described in claim 2 wherein said curved surface of said second lenses are spherical surfaces.

8. Apparatus as described in claim 3 wherein said matching means comprises material of a thickness that is an odd multiple of a quarter wavelength of a propagating sound wave.

9. Apparatus as described in claim 4 wherein said backing plate means comprises material having a thickness that is an integral multiple of a half wavelength of a propagating sound wave.

10. Apparatus as described in claim 4 wherein said matching means comprises material having a thickness that is an odd multiple of a quarter wavelength of a propagating sound wave, and said backing plate means comprises material having a thickness that is an integral multiple of a half wavelength of said propagating sound wave.

11. Apparatus as described in claim 5 wherein said plate means comprises material having a thickness that is an integral multiple of a half wavelength of a propagating sound wave.

12. Apparatus as described in claim 5 wherein said plate means comprises material having a thickness that is an integral multiple of a half wavelength of a propagating sound wave, and said matching means comprises material having a thickness that is an odd multiple of a quarter wavelength of said propagating sound wave.

13. Apparatus as described in claim 2 wherein said first acoustic lens comprises syntactic foam material, said second lenses comprise syntactic foam material, said electro-acoustic transducers comprise piezoelectric ceramic crystals and further including an acoustic propagation medium comprising silicon rubber positioned between said first acoustic lens and said second lenses.

14. Apparatus as described in claim 4 wherein said first acoustic lens comprises syntactic foam material, said second lenses comprise syntactic foam material, said electro-acoustic transducers comprise piezoelectric ceramic crystals, said matching means comprises plastic, said backing plate means comprises metal and further includes an acoustic propagation medium comprising silicon rubber positioned between said first acoustic lens and said second lenses.

15. Apparatus as described in claim 5 wherein said first acoustic lens comprises syntactic foam material, said second lenses comprise syntactic foam material, said electro-acoustic transducers comprise piezoelectric ceramic crystals, said matching means comprises plastic, said plate means comprises metal, and further includes an acoustic propagation medium comprising silicon rubber positioned between said first acoustic lens and said second lenses.

16. Apparatus as described in claim 14 wherein said plastic is epoxy and said metal is aluminum.

17. Apparatus as described in claim 15 wherein said plastic is epoxy and said metal is aluminum.

18. Apparatus as described in claim 14 wherein said electro-acoustic transducers include three piezoelectric ceramic crystals, each inclined 10.5 degrees from a central axis of said first acoustic lens that extends through said first acoustic lens and said focal plane.

19. Apparatus as described in claim 15 wherein said electro-acoustic tansducers include three piezoelectric ceramic crystals, each inclined 10.5 degrees from a central axis of said first acoustic lens that extends through said first acoustic lens and said focal plane.

* * * * *